United States Patent [19]

Fink et al.

[11] 4,140,576

[45] Feb. 20, 1979

[54] APPARATUS FOR NEUTRALIZATION OF ACCELERATED IONS

[75] Inventors: Joel H. Fink; Alan M. Frank, both of Livermore, Calif.

[73] Assignee: The United States of America as represented by the United States Department of Energy, Washington, D.C.

[21] Appl. No.: 725,906

[22] Filed: Sep. 22, 1976

[51] Int. Cl.$^2$ .......... G01N 27/78

[52] U.S. Cl. .......... 176/1; 250/251; 176/5

[58] Field of Search .......... 176/1, 5; 250/251; 332/7.51

[56] References Cited

U.S. PATENT DOCUMENTS

| | | | |
|---|---|---|---|
| 3,360,733 | 12/1967 | Vali et al. | 250/251 |
| 3,532,879 | 10/1970 | Braunstein et al. | 250/251 |
| 3,585,520 | 6/1971 | Yanai et al. | 332/7.51 |
| 3,679,313 | 7/1972 | Rosenberg | 332/112 |
| 3,679,897 | 7/1972 | Hansen et al. | 250/251 |
| 3,701,047 | 10/1972 | Caplaw et al. | 332/7.51 |
| 3,710,279 | 1/1973 | Ashkin | 250/251 |
| 3,808,550 | 4/1974 | Ashkin | 250/251 |

OTHER PUBLICATIONS

Bryant et al., Phys. Rev. Lett. 27, 1628 (1971).
AFAL-TR-74-162 (5/75) Exhibit A.
Phy. Rev. Lett., 19, 737-741, Brehm et al., (1967).
Phy. Rev. Lett., 25, 425-427, Lineberger et al. (1970).
J. Chem. Phys., vol. 48, 1968, 943-945, Hill et al.
Abstract of UCID-61844 (18 Jul., 1975).

*Primary Examiner*—Samuel W. Engle
*Assistant Examiner*—S. A. Cangialosi
*Attorney, Agent, or Firm*—Dean E. Carlson; Roger S. Gaither; P. Martin Simpson, Jr.

[57] ABSTRACT

Apparatus for neutralization of a beam of accelerated ions, such as hydrogen negative ions ($H^-$), using relatively efficient strip diode lasers which emit monochromatically at an appropriate wavelength ($\lambda = 8000$ Å for $H^-$ ions) to strip the excess electrons by photodetachment. A cavity, formed by two or more reflectors spaced apart, causes the laser beams to undergo multiple reflections within the cavity, thus increasing the efficiency and reducing the illumination required to obtain an acceptable percentage (~ 85%) of neutralization.

7 Claims, 2 Drawing Figures

APPARATUS FOR NEUTRALIZATION OF ACCELERATED IONS

BACKGROUND OF THE INVENTION

The invention described herein was made in the course of, or under, Contract No. W-7405-ENG-48, with the Energy Research and Development Administration.

This invention relates to the generation of high energy neutral beams for controlled thermonuclear reactors, particularly to neutralization of accelerated ions by photodetachment techniques, and more particularly to an apparatus for carrying out the photodetachment process.

In the generation of high energy neutral beams of large equivalent current for controlled thermonuclear reactors, beam neutralizers are used for converting a charged particle beam into a beam of neutral particles, such neutralizers being employed in the beam injection systems of the reactors.

Conventional beam neutralizers are based on a charge exchange process between a gas, such as water vapor, and the charged particles of a beam directed through the gas. U.S. Pat. No. 3,112,959 issued Oct. 13, 1964 exemplifies these convention beam neutralizers.

Recently it has been discovered that an effective and efficient technique for neutralizing the charged particle beams involves a process employing photo-induced charge detachment wherein a laser beam is directed across the path of a negative ion beam such as to effect photodetachment of electrons from the beam ions resulting in neutralization of the ion beam. This photodetachment process is described and claimed in a concurrent, copending U.S. Patent application Ser. No. 726,025, filed Sept. 22, 1976, assigned to the assignee of this application.

SUMMARY OF THE INVENTION

The present invention is directed to an apparatus for neutralization of accelerated ions utilizing the photodetachment process, this being accomplished by the use of efficient diode laser irradiation of appropriate wavelength within a cavity formed by two or more spaced reflectors which causes the laser beam or beams to undergo multiple reflections within the cavity. The cavity, in the illustrated embodiment, is formed by two curved reflectors spaced apart and having at least one row of diode lasers positioned along the longitudinal length of the curved reflectors, such that the ion beam to be neutralized passes through the cavity at an angle with respect to the longitudinal axis of the reflectors.

Therefore, it is an object of this invention to provide an apparatus for neutralizing charged particle beams.

A further object of the invention is to provide apparatus for the neutralizing of accelerated ions for controlled thermonuclear reactions.

Another object of the invention is to provide apparatus for neutralizing ion beams by photodetachment.

Another object of the invention is to provide a beam neutralizer wherein a cavity is formed by spaced reflectors and a negative ion beam passing through the cavity is neutralized by directing laser energy into the cavity effecting photodetachment of electrons from negative ions resulting in neutralization of the ion beam.

Another object of the invention is to provide apparatus for neutralization of a beam of accelerated negative hydrogen ions using a plurality of spaced curved reflector members defining a cavity and with strip diode lasers for stripping excess electrons by photodetachment from the negative hydrogen ion beam.

Other objects of the invention will become readily apparent from the following description and accompanying drawings.

DESCRIPTION OF THE INVENTION

The invention is directed to an apparatus for neutralization of a beam of accelerated ions, such as hydrogen negative ions ($H^-$), using relatively efficient strip diode lasers which emit monochromatically at an appropriate wavelength ($\lambda = 8000$ Å for $H^-$ ions) to strip the excess electrons by photodetachment from the beam of accelerated ions. Broadly, the apparatus comprises a cavity, formed by two or more spaced apart reflectors, causing the laser beams to undergo multiple reflections within the cavity, thus increasing the efficiency and reducing the illumination required to obtain an acceptable percentage ($\approx$ 85%) of neutralization.

In the generation of high energy neutral beams of large equivalent current, such as in a 200-keV neutral beam source for controlled thermonuclear reactors (CTR), the most efficient method involves accelerating and focusing negative ions, from which the excess electrons are detached by a photodetachment process. The apparatus hereinafter described for photodetachment of the excess electrons from hydrogen negative ions provides a highly efficient arrangement which is especially useful for large chamber application, such as CTR applications; the efficiency increases with size.

The hydrogen negative ions ($H^-$) are assumed to have 200 keV energy, with corresponding velocities of about $6.2 \times 10^8$ cm/sec. A pulsed diode laser which radiates at a wavelength of approximately $\lambda = 8000$ Å is used, this wavelength corresponding to the maximum theoretical and experimental photodetachment cross-section for $H^-$, as presented by L. M. Branscomb in *Atomic and Molecular Processes,* edited by D. R. Bates, Academic Press, N.Y., 1962, pp. 100–141.

Figure 1:
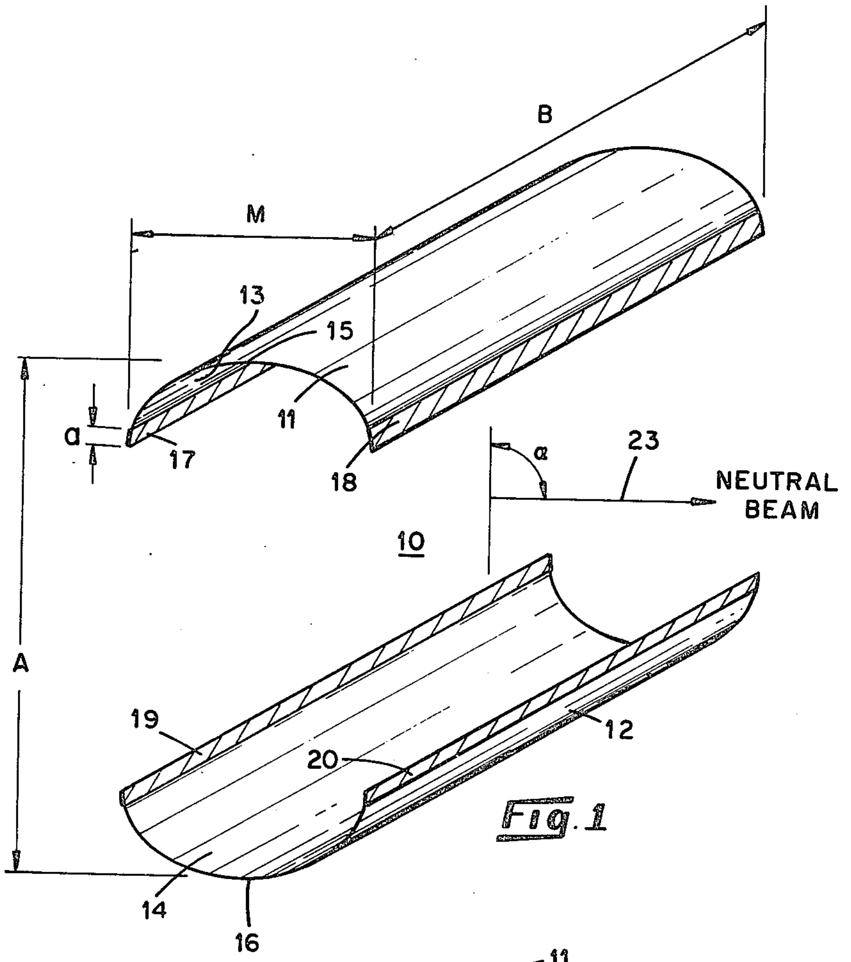
FIG. 1 illustrates an embodiment of the invention.
Figure 2:
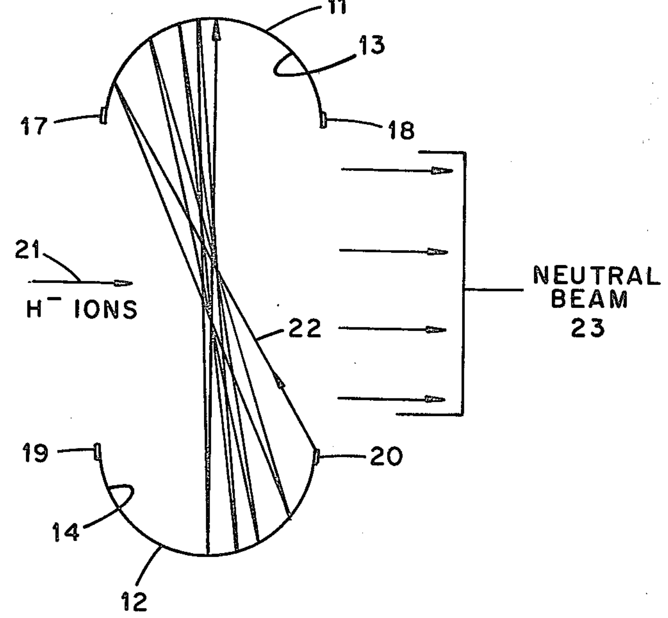
FIG. 2 schematically illustrates the direction of the neutral beam and the laser energy within the FIG. 1 apparatus.

FIGS. 1 and 2 illustrate one embodiment of the invention wherein an optical cavity generally indicated at 10 is formed by two spaced apart curved mirrors or reflectors 11 and 12 having highly reflective inner surfaces 13 and 14, respectively, facing one another, with the apices 15 and 16, respectively, of the two reflectors 11 and 12 being a distance A apart and each reflector having a length B, and width M. For example, distance A may be 50 cm and length B may be 100 cm, and width M may be 50 cm. Each of the four longitudinally extending edges of reflectors 11 and 12 is bounded by a strip diode laser 17, 18, 19 and 20, such as gallium arsenide lasers, having a width, a, and length B. For example, the width a of the diode lasers 17–20 may be 2 cm, and the radius of curvature of reflectors 11 and 12 may be equal to a distance from ½A to A, for this example 50 cm, while the reflectors may be constructed, for example, of silver with a silicon dioxide and titanium dioxide multi-layer stack, having a reflectivity of greater than 99%.

The strip diode lasers 17–20 are similar to those gallium arsenide diodes commercially produced by RCA, Solid State Electro Optics Div., Lancaster, Penn. (series SG 4000) except that the individual gallium arsenide diodes would be mounted on a linear liquid nitrogen cooled bulkhead to conform with dimensions a and B of FIG. 1.

As shown in FIG. 2, the $H^-$ ions are accelerated and focused as indicated at arrow 21 so as to pass between the two reflectors 11 and 12 in a direction substantially perpendicular to the longitudinal axis of the reflectors. As the ion beam passes between the reflectors, the ions are irradiated by laser light energy, indicated at 22, from at least one of the four strip diode lasers 17-20, each of which has a duty cycle of 25%. Only laser 20 is shown activated in FIG. 2. A double row approach, employing eight strip diode lasers rather than four, may be used if the duty cycle of each laser, is 12½ to 25%. The negative ion beam 22 is stripped of excessive electrons, as decribed hereinafter, resulting in a neutral beam 23 for use in a CTR or other point of use.

Electron stripping or detachment by a plasma has been experimentally demonstrated with $H^-$ beams of energy 0.5 to 1.0 MeV, with detachment of 80% of the incident negative ion beam. The following simple analysis indicates that high percentages of neutrals are obtainable. Consider an $H^-$ beam traveling through a cavity which has an approximately uniform photon flux density of wavelength $\lambda$ of f photons/cm$^2$-sec. throughout. The cavity illuminance is thus $$W = f(hc/\lambda) \text{ watts/cm}^2.$$

At the wavelength $\lambda$ (= 8000 Å here), the photodetachment cross section is $$\sigma_{pd}(\lambda) = 4 \times 10^{-17} \text{ cm}^2.$$

The associated frequency of the photodetachment reaction is $$\nu = f\sigma_{pd} = 160 \text{ W per second per incident ion.}$$

With a concentration of $N_{H-}$ ions passing through the cell at an ion velocity of $$v = \sqrt{2eV/m_H},$$

then, the rate of electron photodetachment is determined by $$(d/dt)\, N_{H-} = v(d/dz)\, N_{H-} = -\nu N_{H-},$$

where z is the coordinate in the direction of the ion beam (O Z L defines the effective cavity length). This yields $$g = 1 - \frac{N_{H-}(Z = L)}{N_{H-}(Z = O)} = 1 - e^{-\nu L/v} = 1 - \exp\left[-\frac{\lambda\sigma}{hc}\sqrt{\frac{m_H}{2eV}}\, WL\right]$$

is the fraction g of original $H^-$ ions which are neutralized within the cavity. If one chooses an overall factor of, say, 0.85, and considers 200 keV $H^-$ ions, this requires that the product of cavity length L and cavity illuminance W be $$WL = (v/160)\, ln\, [(1/1 - g)] = 7.36 \times 10^6 \text{ watts/cm}$$

a number which may be obtainable for cavity lengths L $\simeq$ 200 cm.

The cavity illuminance W is increased by use of the reflective surfaces 13 and 14 of reflectors 11 and 12 to redirect the laser irradiation 22 through the $H^-$ beam 21 many times as indicated in FIG. 2. The beam divergence of a GaAs diode laser, which emits at $\lambda$ = 8500 Å, is $\Delta\theta$ = 21°-30°, which presents severe laser beam walkoff problems at the reflectors. By use of distributed feedback, the beam divergence of such a laser may be reduced to $\Delta\theta$ = 0.35°. A reduction to $\Delta\theta$ = 0.05° is desirable, from other considerations. When this is achieved, the effective cavity length L is increased 10- to 100-fold by the multiple reflections of each laser beam within the cavity 10, and this reduces the required cavity illuminance proportionality.

The $H^-$ ion considered above may be replaced by any other ion of interest, such as $D_2^-$, by merely changing the associated photodetachment cross-section and the wavelength at which said cross-section is maximized.

It has thus been shown that the present invention involves an effective apparatus for neutralizing a beam of accelerated ions utilizing the photodetachment process by stripping off excess electrons, thereby providing a significant advance in the beam neutralizer act.

While particular embodiments have been illustrated or described, modifications and changes will become apparent to those skilled in the art, and it is intended to cover in the appended claims all such modifications and changes as come within the spirit and scope of the invention.

What we claim is:

1. An apparatus for neutralizing a beam of accelerated negative ions comprising;
   - a plurality of spaced concave reflectors each having edges and defining a cavity therebetween;
   - means for directing a multiampere beam of negatively charged ions through said cavity; and
   - at least one strip diode laser positioned near at least one edge of said concave reflectors to direct a laser beam into said cavity outside of said laser means, for a multiplicity of reflections by the concave reflectors and a multiplicity of passes of the laser beam through the ion beam,
   - said laser being directed at an angle to said ion beam and having photons, each of an energy sufficient to photodetach an electron from a negatively charged ion in the said ion beam,
   - at least 80% of the beam of negative ions being neutralized.

2. The apparatus defined in claim 1, wherein said plurality of reflectors consists of two curved reflectors, each reflector having a highly reflective inner surface, said inner surfaces being positioned in a facing relationship to one another.

3. The apparatus defined in claim 2, wherein said laser means comprises a plurality of strip diode lasers, each of said curved reflectors having a pair of said strip diode lasers positioned along longitudinally extending edges thereof.

4. An apparatus for neutralizing a beam of accelerated negative ions as in claim 1, wherein the negative ions are of predominately a single excess elementary charge.

5. An apparatus for neutralizing a beam of accelerated negative ions as in claim 1, wherein the beam is of a predominately monatomic species.

6. An apparatus for neutralizing a beam of accelerated negative ions as in claim 5, wherein the predominately monatomic species is at least one isotope of hydrogen.

7. An apparatus for neutralizing a beam of accelerated negative ions as in claim 6, wherein the isotope of hydrogen is predominately deuterium.

* * * * *